April 1, 1952   J. HART   2,591,256
BISCUIT CUTTING MACHINE AND THE LIKE
Filed April 29, 1947
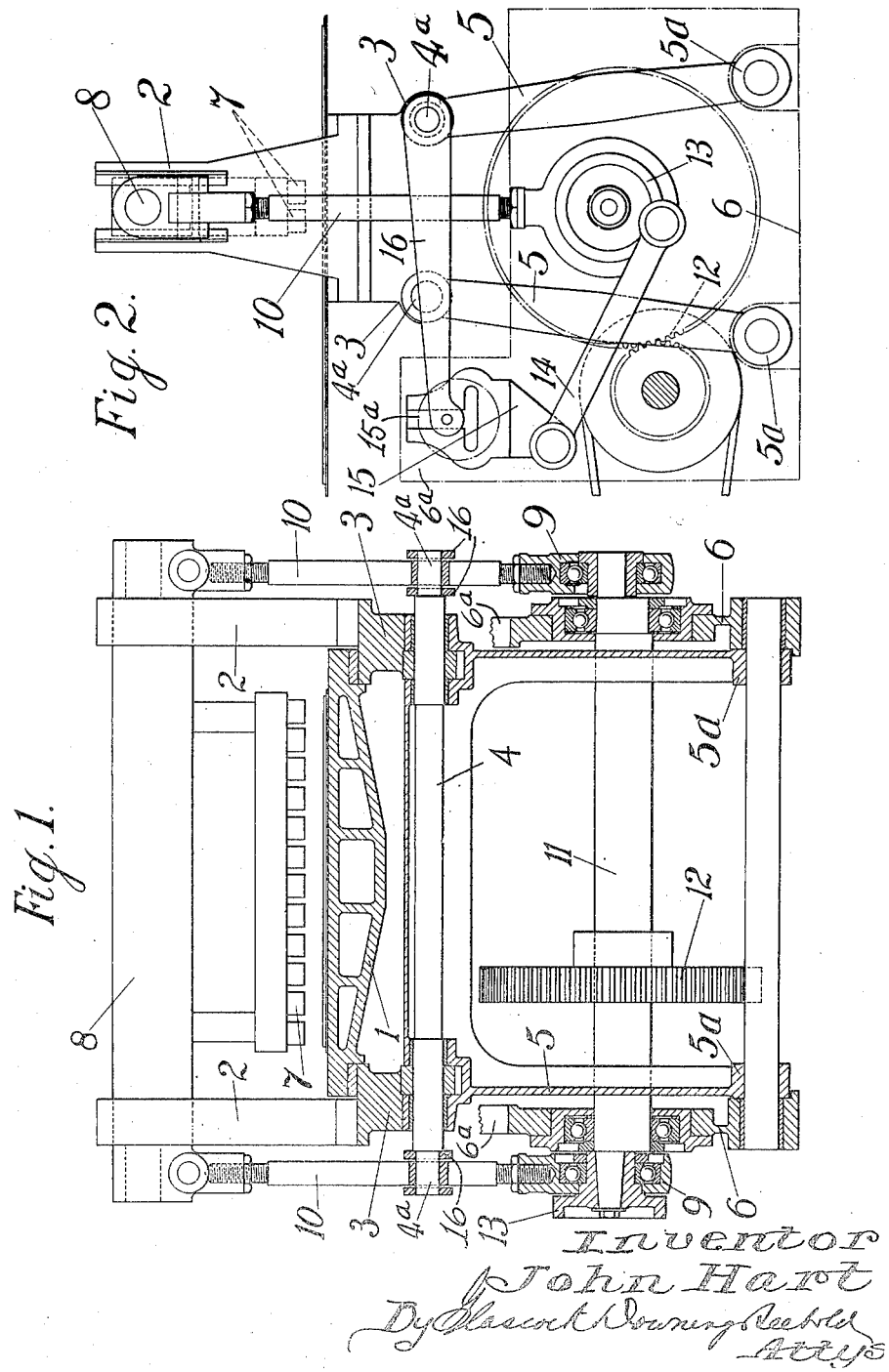
Inventor
John Hart Patented Apr. 1, 1952

2,591,256

UNITED STATES PATENT OFFICE 2,591,256

BISCUIT CUTTING MACHINE AND THE LIKE

John Hart, Peterborough, England, assignor to Baker Perkins Incorporated, Saginaw, Mich.

Application April 29, 1947, Serial No. 744,602
In Great Britain May 8, 1946

4 Claims. (Cl. 107—24)

This invention relates to cutting machines, or cutting and embossing machines for biscuit doughs, of the type in which a cutter bar vertically reciprocable in lateral guides is oscillated with the table carriage on upstanding links in the direction of travel of the dough sheet at a rate such that during the cut or impression substantially no relative movement exists between the cutters (or embossers) and the dough sheet. In these machines the oscillating rate is rapid and the cutter bar mass is substantial, with the result that noise and wear and tear are considerable.

An aim of the present invention is to provide improvements calculated to reduce the momentum of the cutter bar and derive the consequent advantages.

The invention consists in reducing the horizontal travel of the cutter bar during the oscillating action to a minimum by mounting the table carriage, cutter bar and guides (hereinafter referred to as cutter head) upon links or link frames arranged convergently inwards towards the central transverse vertical cutter plane such that the oscillating action takes place substantially about an imaginary centre lying within the vertical stroke of the cutter bar, and preferably within the central zone of its vertical travel.

The invention also consists in a cutting or cutting and embossing machine for biscuit doughs, wherein the cutter head is mounted upon links or link frames arranged convergently upwards towards the central vertical cutting plane, said links converging to a point located at a position relatively to the axis of the cutter bar that the lateral reciprocations of the cutter bar are reduced to a considerable extent without producing excessive rocking of the cutter block and cutters.

In the accompanying drawing:

Figure 1 is a front elevation (partly in section), and

Figure 2 is an end elevation of a biscuit cutting machine embodying the invention.

In carrying the invention into effect according to one mode, as described by way of example, the table carriage 1 from which the cutter bar guides 2 extend vertically upwards, is provided with mountings 3 at its underside for a pair of transverse shafts 4 in a similar manner to that heretofore employed where parallel links are utilised, but in the present case the shafts are carried in the upper ends of links or link frames 5 which are spaced longitudinally of the machine a somewhat lesser distance apart than the usual links (viewing the cutter head in side elevation), while the lower ends 5a of the links are pivoted to the machine frame 6 at points spaced slightly further apart longitudinally of the machine than usual, with the result that the pair of links on each side of the machine converge upwardly and straight lines through the pivotal points at both ends of the links intersect in the central vertical transverse cutter plane. The position of the intersecting point may be between the extremities of the vertical stroke of the cutter bar and may be round about the mean position of said stroke.

The cutters 7 carried by the cutter bar 8 may be reciprocated by any known means, for example the cutting reciprocation may be effected through eccentrics 9 and connecting rods 10 from the shaft 11 driven from gearing 12 in known manner. The rocking reciprocation of the table and cutter head may be effected through known mechanism comprising a crank disc 13 coupled to one of the eccentrics 9. The crank disc 13 is coupled by a rod 14 to a lever plate 15 mounted on one end of a rock shaft (not shown) supported in bearings in the extensions 5a of the frames 6. The lever plate 15 has a slot 15a radial to the rock shaft in which one end of a link 16 is secured by means of a sliding block (not shown). The other end of the link 16 is connected to the overhung end 4a of one of the shafts 4. A second link 16 is connected to the other overhung end 4a of the shaft 4, this link being connected at its other end to a lever plate similar to 15 mounted on the rock shaft. Each link 16 comprises a pair of arms laterally spaced to lie on either side of the adjacent rod 10.

In operation, the converging links 5 cause the carriage 1 and its superstructure to tilt slightly in its displacement in the direction of dough sheet travel, one link (table) pivot or shaft 4 being lowered in unison with a rise in the other link pivot or shaft so that oscillation takes place in the horizontal displacement.

According to this arrangement the cutter bar 8, instead of possessing substantially the same displacement as the table carriage 1, has a diminished displacement by reason of the oscillating movement taking place about the imaginary centre or intersection point of the link centre lines.

The normal parallel link motion simulates a horizontal travel for the table and with the same purpose in view the disposal, according to the present invention, of the links in converging relation affords a table travel sufficienty close to the horizontal to be satisfactory.

I claim:

1. A machine for cutting or cutting and embossing biscuits from a travelling dough web, comprising a cutter head including a table carriage, and a cutter bar, means for reciprocating the cutter bar relatively to the cutter head to provide a cutting stroke, said means including a member having a pivotal axis on said cutter bar, a mounting for the cutter head comprising spaced link frames pivoted at their upper ends to the table carriage and pivoted at their lower ends to a machine framing, means for oscillating the link frames about their lower pivots to reciprocate the cutter head in the direction of travel of the dough web, said link frames converging upwardly so that planes containing their longitudinal axes intersect in a line located at a position relative to the pivotal axis of the cutter bar such that the amplitude of movement of the cutter bar in the direction of travel of the dough web is less than that of the table carriage while avoiding excessive rocking of the cutter head.

2. A machine for cutting or cutting and embossing biscuits from a travelling dough web as claimed in claim 1, wherein the spacing of the upper and lower ends of the link frames is such that the link frames converge upwardly to a line of intersection which is adjacent but above the pivotal axis of the cutter bar when the cutter bar is at the upper end of its stroke.

3. A machine for cutting or cutting and embossing biscuits from a travelling dough web as claimed in claim 1, wherein the spacing of the upper and lower ends of the link frames is such that the link frames converge upwardly at an angle such that the cutter bar oscillates about an imaginary axis within the stroke of the cutter bar.

4. A machine for cutting or cutting and embossing biscuits from a travelling dough web as claimed in claim 3, wherein said axis lies within the central zone of the stroke of the cutter bar.

JOHN HART.

REFERENCES CITED

The following references are of record in the file of this patent:

UNITED STATES PATENTS

| Number | Name | Date |
|---|---|---|
| 1,677,180 | Green et al. | July 17, 1928 |